(12) United States Patent
Ge

(10) Patent No.: US 10,928,913 B2
(45) Date of Patent: Feb. 23, 2021

(54) MOBILE TERMINAL

(71) Applicant: AAC Technologies Pte. Ltd., Singapore (SG)

(72) Inventor: Huan Ge, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/705,267

(22) Filed: Dec. 6, 2019

(65) Prior Publication Data

US 2020/0209970 A1 Jul. 2, 2020

(30) Foreign Application Priority Data

Dec. 29, 2018 (CN) .................. 2018 2 2269317 U

(51) Int. Cl.
    *H04R 5/02*    (2006.01)
    *G06F 3/01*    (2006.01)
    *H04M 1/02*    (2006.01)
    *G06F 1/16*    (2006.01)

(52) U.S. Cl.
    CPC ............ *G06F 3/016* (2013.01); *G06F 1/1626* (2013.01); *G06F 1/1637* (2013.01); *H04M 1/0266* (2013.01); *H04R 5/02* (2013.01); *H04M 2250/22* (2013.01); *H04R 2499/11* (2013.01)

(58) Field of Classification Search
    CPC ........ H04R 2499/11; H04R 5/02; G06F 3/016
    See application file for complete search history.

(56) References Cited

U.S. PATENT DOCUMENTS

| | | | |
|---|---|---|---|
| 3,857,382 A * | 12/1974 | Williams, Jr. | A61M 1/1053 600/17 |
| 8,569,931 B2 * | 10/2013 | Liu | G06F 3/0487 310/318 |
| 9,747,762 B1 * | 8/2017 | Wang | G08B 6/00 |
| 10,264,348 B1 * | 4/2019 | Harris | H04R 17/10 |
| 10,457,207 B2 * | 10/2019 | Lee | B60Q 9/00 |
| 10,681,471 B2 * | 6/2020 | Starnes | H01L 41/0966 |

(Continued)

FOREIGN PATENT DOCUMENTS

CN  108881523 A1  11/2018

OTHER PUBLICATIONS

PCT search report dated Jan. 3, 2020 by SIPO in related PCT Patent Application No. PCT/CN2019/111298 (4 Pages).

(Continued)

*Primary Examiner* — Temesghen Ghebretinsae
*Assistant Examiner* — Karin Kiyabu
(74) *Attorney, Agent, or Firm* — W&G Law Group LLP

(57) ABSTRACT

The present application discloses a mobile terminal. The mobile terminal includes a housing; a screen module; an elastic member received in the receiving cavity; and an exciter sandwiched between the elastic member and the screen module, the exciter driving the screen module to vibrate, the exciter including a bottom wall, a lateral wall extending bently towards the screen module from the bottom wall, and a top wall covered on the lateral wall; one end of the elastic member is fixed to the housing, the other end is spaced from the housing and abuts against the bottom wall of the exciter; the top wall is fixed to the screen module, and the elastic member is in a compression deformation state to resist against the bottom wall.

5 Claims, 5 Drawing Sheets

(56) References Cited

U.S. PATENT DOCUMENTS

| | | | |
|---|---|---|---|
| 2006/0140424 A1* | 6/2006 | Kobayashi | H04R 7/045 |
| | | | 381/190 |
| 2012/0149437 A1* | 6/2012 | Zurek | H04R 7/18 |
| | | | 455/566 |
| 2012/0162143 A1* | 6/2012 | Kai | H04R 17/00 |
| | | | 345/177 |
| 2015/0153829 A1* | 6/2015 | Shiraishi | G06F 1/1626 |
| | | | 345/173 |
| 2018/0269808 A1* | 9/2018 | Park | H01L 41/053 |

OTHER PUBLICATIONS

PCT written comments dated Jan. 3, 2020 by SIPO in related PCT Patent Application No. PCT/CN2019/111298 (4 Pages).

* cited by examiner

100

A–A

MOBILE TERMINAL

FIELD OF THE PRESENT DISCLOSURE

The present disclosure relates to the field of electroacoustic conversion, and more particularly to a mobile terminal.

DESCRIPTION OF RELATED ART

With the advent of the mobile internet era, the number of smart mobile devices continues to rise. Among many mobile devices, mobile phone is undoubtedly the most common and portable mobile terminal. Nowadays the mobile phone has diverse functions, one of which is high-quality music. Thus, sound-emitting devices for emitting sounds are now widely applied to the mobile phones. As the mobile terminal commonly has a limited size, the hardware of the mobile terminal needs to be optimized to adapt the size of the mobile terminal, with the upgrade of the mobile terminal. As a result, for saving space, using an exciter to drive a screen of the mobile terminal to emit sounds is a choice to replace the sound-emitting devices.

In related art, a mobile terminal commonly includes a housing, a screen covered on the housing and cooperatively forming a receiving cavity with the housing, and an exciter accommodated in the receiving cavity and resisting the screen. The exciter vibrates to drive the screen vibrating to generate sounds.

In related art, the exciter is fixed on a middle cover of the housing by means of adhesive, screws, or clasps, and a bonding wire is draw forth from the lateral side of the exciter. However, such a structure increases the lateral size of the mobile terminal, which does not take the advantage of structural stacking and space utilization. In addition, using adhesive to fix the exciter can hardly have a perfect performance on the drop reliability for the mobile terminal, and using screws or clasps to fix the exciter also increases the lateral size of the mobile terminal, which is bad for using the space. Additionally, in other related art, the exciter is directly fixed on the screen, thus, the screw or clasp cannot used, which would cause a risk on drop reliability.

Therefore, it is desirable to provide a new mobile terminal to overcome the above-mentioned problems.

BRIEF DESCRIPTION OF THE DRAWINGS

To clearly illustrate the technical solutions that are reflected in various embodiments according to this disclosure, the accompanying drawings intended for the description of the embodiments herein will now be briefly described. It is evident that the accompanying drawings listed in the following description show merely some embodiments according to this disclosure, and that those having ordinary skill in the art will be able to obtain other drawings based on the arrangements shown in these drawings without making inventive efforts.

DETAILED DESCRIPTION OF THE EXEMPLARY EMBODIMENT

The technical solution of the embodiment of the present disclosure will be clearly and completely described in the following with reference to the accompanying drawings. It is obvious that the embodiment to be described are only a part rather than all of the embodiments of the present disclosure. All other embodiments obtained by persons skilled in the art based on the embodiment of the present disclosure without creative efforts shall fall within the protection scope of the present disclosure.

Figure 1:
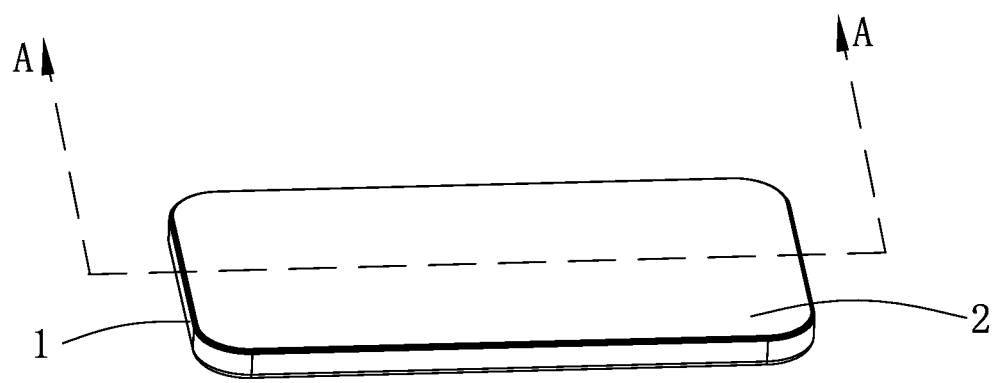
FIG. 1 is a perspective view of a mobile terminal in accordance with an embodiment of the present disclosure.
Figure 2:
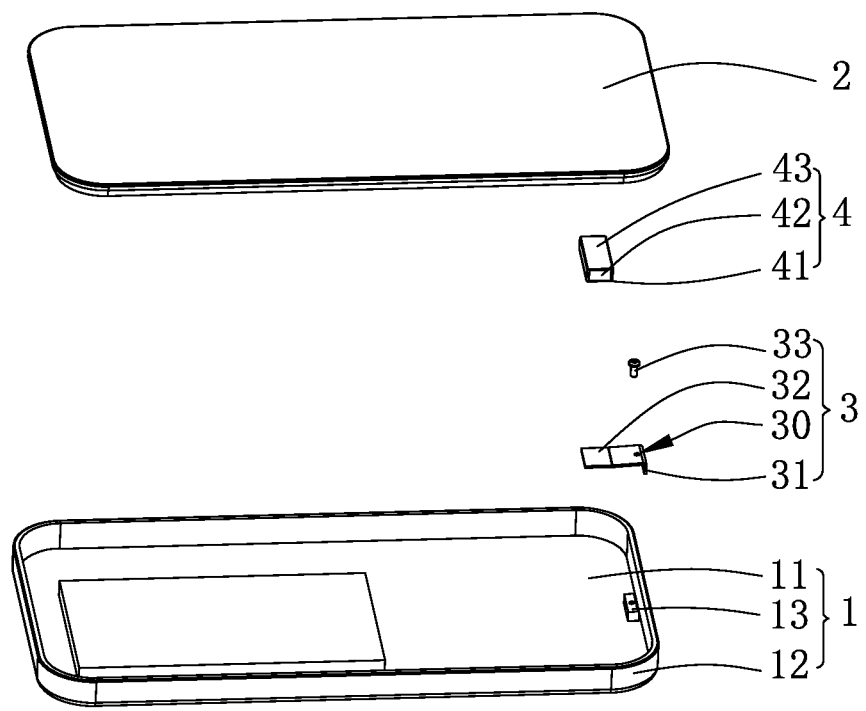
FIG. 2 is an exploded view showing a portion of the mobile terminal in accordance with the embodiment of the present disclosure.
Figure 3:
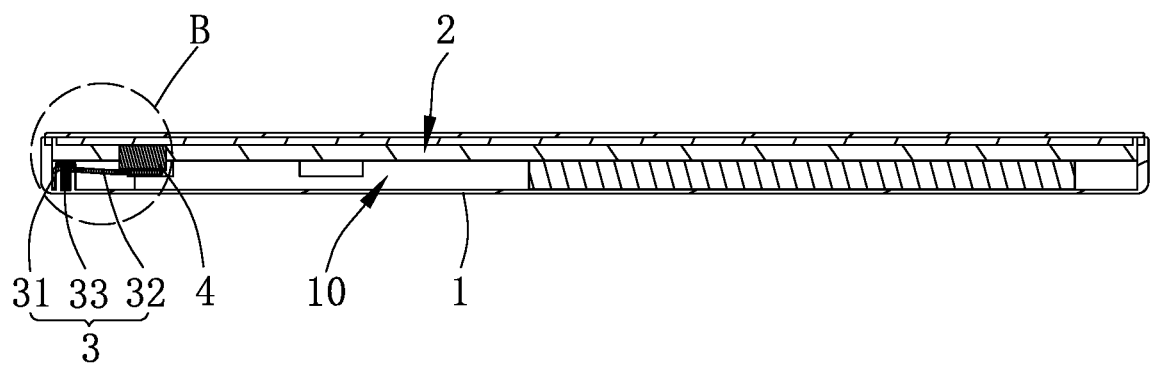
FIG. 3 is a cross-sectional view of the mobile terminal in FIG. 1 taken along line A-A.
Figure 4:
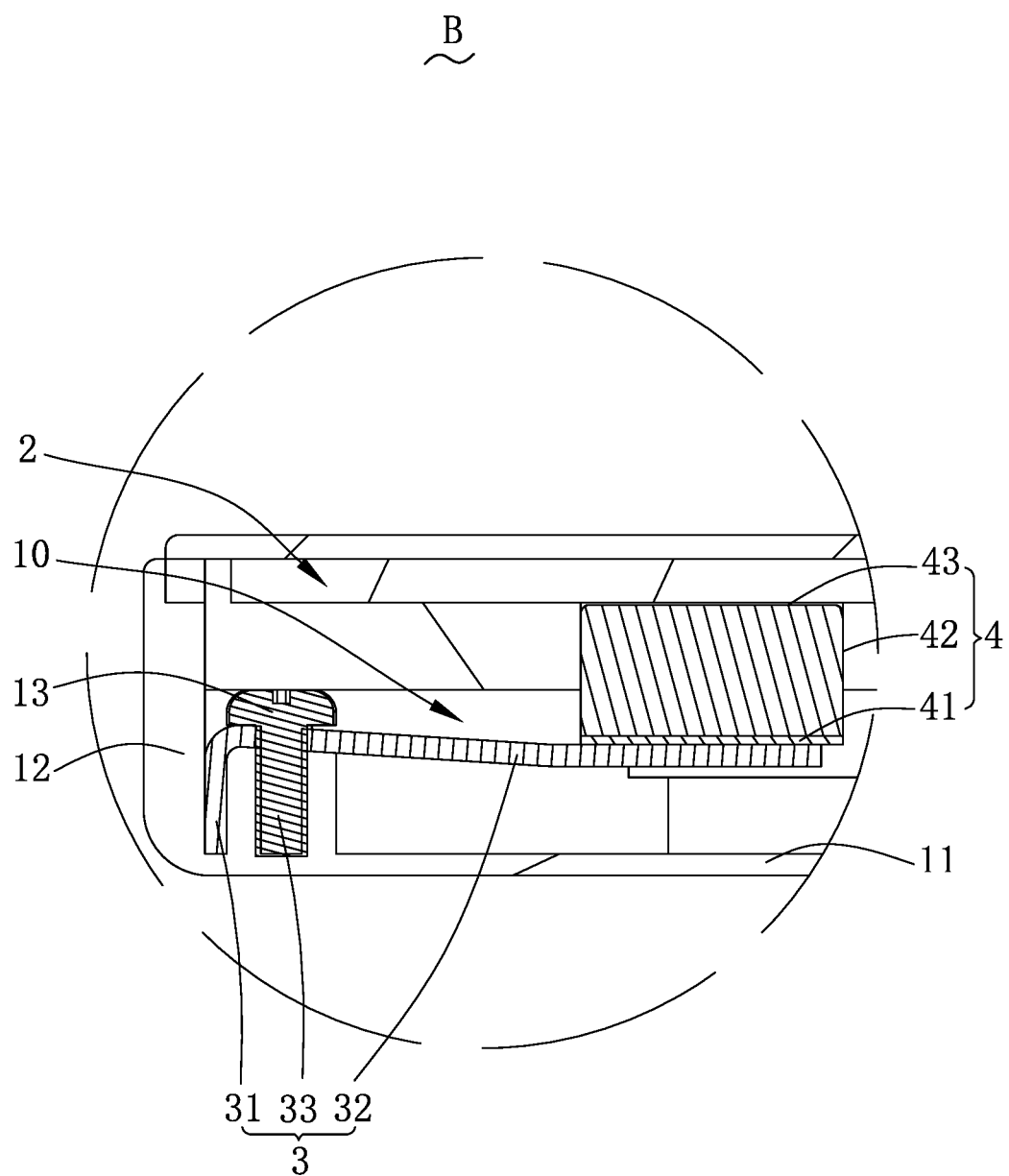
FIG. 4 is an enlarged view of portion B in FIG. 3.
Figure 5:
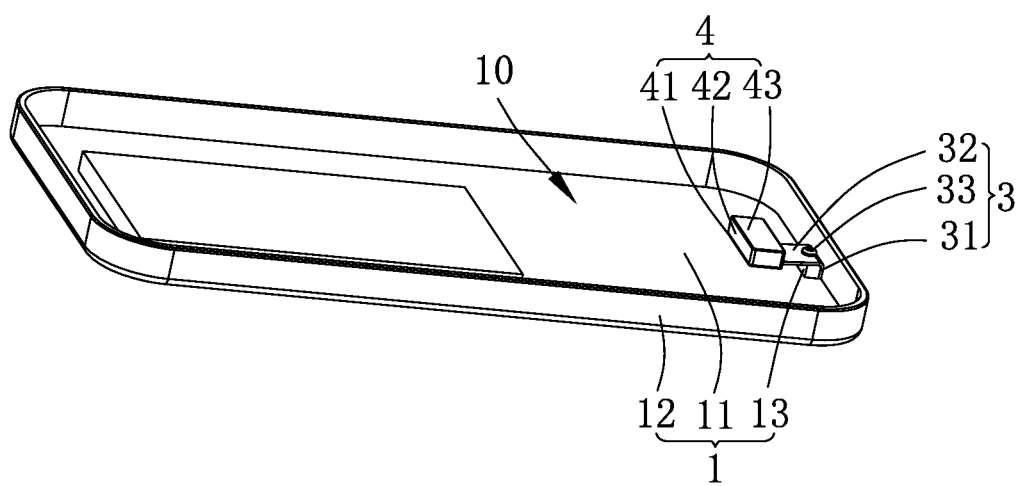
FIG. 5 is an assembly view of part of the mobile terminal in accordance with the embodiment of the present disclosure.

Referring to FIGS. 1 through 5, a mobile terminal 100 is provided. The mobile terminal 100 includes a housing 1, a screen module 2, an elastic member 3, and an exciter 4. The terminal 100 may be a mobile phone, a tablet computer, or a telephone watch, and so on.

The housing 1 includes a bottom plate 11, a side wall 12 extending bently from the edge of the bottom plate 11, and a supporting block 13 protruded from the bottom plate 11.

The screen module 2 and the housing 1 cooperatively form a receiving cavity 10. The screen module 2 is covered on the housing 1. Specifically, the screen module 2 is covered on the side wall 12 of the housing 1.

The elastic member 3 is fixed in the receiving cavity 10 and is configured to provide precompression and resist against the exciter 4. In the embodiment, the elastic member 3 is an elastic metal sheet, for instance, a steel sheet.

The exciter 4 is sandwiched between the elastic member 3 and the screen module 2 along the thickness direction of the mobile terminal 100. Specifically, the exciter 4 includes a bottom wall 41, a lateral wall 42 extending towards the screen module 2 from the bottom wall 41, and a top wall 43 covered on the lateral wall 42. In the embodiment, the top wall 43 is adhered to the screen module 2.

In the embodiment, one end of the elastic member 3 is fixed to the housing 1, the other end is spaced from the housing 1 and resisted against the bottom wall 41. The elastic member 3 is in a compression deformation state during resisting against the bottom wall 41, so that the top wall 43 abut against the screen module 2. In such a structure, the elastic member 3 generate a pre-pressure towards the screen module 2 to make the exciter 4 resist against the screen module 2 and be latched between the screen module 2 and the elastic member 3. At the same time, the exciter 4 is in a rebounded state under the pre-pressure of the elastic member 3, thus there is a certain space for the exciter 4 to stretch out and draw back, which may improve the fixing of the exciter 4, as well as the drop reliability of the mobile terminal 100. In addition, such a structure can be simply assembled and has highly consistency. Further, the elastic member 3 is directly fixed to the housing 1, thus designers can select the fixing point for fixing the elastic member 3 on the housing 1 based on the actual need, and can also make full use of the gap in the whole structure to assemble and fix the elastic member 3 or other elements, which has the advantage of saving space.

In the embodiment, the elastic member 3 is fixed to the housing 1 by a fixing member 33.

Specifically, the elastic member 3 includes a supporting arm 31 resisting against the housing 1 and extending towards the screen module 2, an elastic arm 32 extending bently from the supporting arm 31 and towards the exciter 4, and the fixing member 33. One end of the elastic arm 32 close to the supporting arm 31 is fixed to the housing 1 by the fixing member 33, and one end of the elastic arm 32 away from the supporting arm 31 abuts against the bottom wall 41.

The supporting arm 31 is supported by the bottom plate 11 and abuts against the side wall 12. The end of the elastic arm 32 close to the supporting arm 31 defines a first through hole 30. The fixing member 33 passes through the first through hole 30 and fixes the elastic arm 32 to the bottom plate 11. In the embodiment, the fixing member 33 is a screw.

For the sake of fixing the elastic member 3 to the housing 1 better, the supporting block 13 is designed to resist against the supporting arm 31, making the supporting arm 31 be sandwiched between the supporting block 13 and the side wall 12, and the elastic arm 32 is fixed to the supporting block 13 by the fixing member 33. It should be understood that, the elastic member 3 may also be directly fixed to the housing 1 by a screw without the assistance of the supporting block 13.

Compared to the related art, the mobile terminal of the present disclosure has one end of the elastic member being fixed to the housing, the other end being spaced from the housing and abutting against the bottom wall, making the elastic member be in a compression deformation state, thus the top wall of the exciter can be allowed to abut against the screen module. That is, the elastic member provides a certain pre-pressure to allow the exciter resisting against the screen module, making the exciter 4 be latched between the elastic member and the screen module. The elastic member is directly fixed to the housing, thus can make full use of the gap in the whole structure to assemble and fix the elastic member, which has the advantage of saving space. At the same time, the fixing of the exciter and the drop reliability of the mobile terminal may also be improved benefitting from the rebounding force that the elastic member possesses. In addition, such a structure that the elastic member is directly fixed to the housing can be simply assembled and has highly consistency.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A mobile terminal, comprising:
a housing;
a screen module covered on the housing, the screen module and the housing cooperatively forming a receiving cavity;
an elastic member received in the receiving cavity; and
an exciter sandwiched between the elastic member and the screen module along a thickness direction of the mobile terminal, the exciter driving the screen module to vibrate, the exciter comprising a bottom wall, a lateral wall extending bently towards the screen module from the bottom wall, and a top wall covered on the lateral wall; wherein
one end of the elastic member is fixed to the housing, another end is spaced from the housing and abuts against the bottom wall of the exciter;
the top wall is fixed to the screen module, and the elastic member is in a compression deformation state to resist against the bottom wall; wherein
the elastic member comprises a supporting arm resisting against the housing and extending towards the screen module, an elastic arm extending bently from the supporting arm and towards the exciter, and a fixing member;
one end of the elastic arm close to the supporting arm is fixed to the housing by the fixing member, and another end of the elastic arm away from the supporting arm abuts against the bottom wall.

2. The mobile terminal according to claim 1, wherein the housing comprises a bottom plate and a side wall extending bently from a periphery edge of the bottom plate, the screen module is covered on the side wall, the supporting arm is supported by the bottom plate and abuts against the side wall, one end of the elastic arm close to the supporting arm defines a first through hole, and the fixing member passes through the first through hole and fixes the elastic arm to the bottom plate.

3. The mobile terminal according to claim 2, wherein the housing further comprises a supporting block protruded from the bottom plate and resisting against the supporting arm, and the supporting arm is sandwiched between the supporting block and the side wall; the elastic arm is fixed to the supporting block by the fixing member.

4. The mobile terminal according to claim 2, wherein the fixing member is a screw.

5. The mobile terminal according to claim 1, wherein the top wall is adhered to the screen module.

* * * * *